United States Patent
Zhou et al.

(10) Patent No.: US 11,487,740 B2
(45) Date of Patent: *Nov. 1, 2022

(54) REDUCE LOG CONTENTION BY BATCHING LOG RECORD TRANSFERS TO THE LOG

(71) Applicant: SYBASE, INC., Dublin, CA (US)

(72) Inventors: Fei Zhou, Northfield, IL (US); Sarika Iyer, Fremont, CA (US); Graham Ivey, Hampshire (GB)

(73) Assignee: Sybase, Inc., Dublin, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/024,552

(22) Filed: Sep. 17, 2020

(65) Prior Publication Data

US 2021/0004364 A1 Jan. 7, 2021

Related U.S. Application Data

(63) Continuation of application No. 14/208,958, filed on Mar. 13, 2014, now Pat. No. 10,817,500.

(51) Int. Cl.
*G06F 16/23* (2019.01)
*G06F 16/21* (2019.01)
*G06F 16/2455* (2019.01)
*G06F 16/24* (2019.01)

(52) U.S. Cl.
CPC .......... *G06F 16/2358* (2019.01); *G06F 16/21* (2019.01); *G06F 16/2343* (2019.01); *G06F 16/2365* (2019.01); *G06F 16/24552* (2019.01)

(58) Field of Classification Search
CPC .. G06F 16/2358; G06F 16/21; G06F 16/2343; G06F 16/24552; G06F 16/2365
See application file for complete search history.

(56) References Cited

U.S. PATENT DOCUMENTS

| | | | | |
|---|---|---|---|---|
| 5,832,508 A | * | 11/1998 | Sherman | ............. G06F 16/2358 |
| 6,101,504 A | * | 8/2000 | Gord | ................... G06Q 30/0283 |
| 8,768,891 B2 | * | 7/2014 | Schreter | ............. G06F 16/2365 707/672 |

(Continued)

OTHER PUBLICATIONS

"U.S. Appl. No. 14/208,958, Appeal Brief dated Mar. 19, 2018", 25 pgs.

(Continued)

*Primary Examiner* — Alford W Kindred
*Assistant Examiner* — Cecile H Vo
(74) *Attorney, Agent, or Firm* — Schwegman Lundberg & Woessner, P.A.

(57) ABSTRACT

A system for managing database logging, the comprises a processor; and a user task executing in a database server process and executable by the processor, the user task to: receive in a database management system on a database server, a command to manipulate a portion of a database managed by the database management system; obtain a lock on the portion of the database; create a first log record in a first private log cache associated with the user task, the first log record recording a data manipulation to the portion of the database; enqueue the first log record to a queue; and release the lock on the portion of the database after copying the first log record to the queue.

20 Claims, 7 Drawing Sheets

(56) References Cited

U.S. PATENT DOCUMENTS 8,965,861 B1 * 2/2015 Shalla .................. G06F 16/2343
                                                    707/703
2015/0261808 A1    9/2015 Zhou et al.

OTHER PUBLICATIONS

"U.S. Appl. No. 14/208,958, Appeal Decision dated Apr. 13, 2020", 5 pgs.
"U.S. Appl. No. 14/208,958, Examiner Interview Summary dated Feb. 27, 2017", 3 pgs.
"U.S. Appl. No. 14/208,958, Examiner's Answer dated Jul. 18, 2018", 8 pgs.
"U.S. Appl. No. 14/208,958, Final Office Action dated Oct. 19, 2017", 15 pgs.
"U.S. Appl. No. 14/208,958, Final Office Action dated Dec. 15, 2016", 13 pgs.
"U.S. Appl. No. 14/208,958, Non Final Office Action dated Apr. 21, 2017", 13 pgs.
"U.S. Appl. No. 14/208,958, Non Final Office Action dated May 19, 2016", 11 pgs.
"U.S. Appl. No. 14/208,958, Notice of Allowance dated Jun. 22, 2020", 6 pgs.
"U.S. Appl. No. 14/208,958, Reply Brief dated Sep. 5, 2018", 6 pgs.
"U.S. Appl. No. 14/208,958, Response filed Mar. 1, 2017 to Final Office Action dated Dec. 15, 2016", 14 pgs.
"U.S. Appl. No. 14/208,958, Response filed Jun. 28, 2017 to Non Final Office Action dated Apr. 21, 2017", 13 pgs.
"U.S. Appl. No. 14/208,958, Response filed Aug. 8, 2016 to Non Final Office Action dated May 19, 2016", 11 pgs.
"European Application Serial No. 14004163.3, Search Report dated Apr. 14, 2015", 7 pgs.

* cited by examiner ns. The use of a PLC reduces log semaphore contention by batching log records into the PLC and then transferring them to the log. This is made possible because the overhead of the log semaphore is amortized across the batch of log records.

REDUCE LOG CONTENTION BY BATCHING LOG RECORD TRANSFERS TO THE LOG

CROSS-REFERENCE TO RELATED APPLICATIONS

This application is a continuation of prior application Ser. No. 14/208,958, filed on Mar. 13, 2014, entitled "REDUCE LOG CONTENTION BY BATCHING LOG RECORD TRANSFERS TO THE LOG," and issued on Oct. 27, 2020 as U.S. Pat. No. 10,817,500, which is incorporated by reference herein in its entirety.

TECHNICAL FIELD

This document generally relates to information processing environments. Example embodiments relate to systems and methods to reduce log contention by batching log record transfers to the log.

BACKGROUND

Computer systems are very powerful tools for storing and providing access to vast amounts of information. Computer databases are a common mechanism for storing information on computer systems while providing easy access to users. A typical database is an organized collection of related information stored as "records" having "fields" of information. As an example, a database of employees can have a record for each employee where each record contains fields designating specifics about the employee, such as name, home address, salary, and the like.

A database management system (DBMS) is provided as a software interface between the physical database (e.g., the data stored on a storage device) and the users. The DBMS relieves database users from the need to know about the details of the underlying hardware. Requests from users for access to the data are processed by the DBMS. For example, information can be added or removed from data files, information retrieved from or updated in such files, and so forth, all without a user's knowledge of the underlying system implementation. In this manner, the DBMS provides users with a conceptual view of the database that is abstracted from the hardware level.

A DBMS can be employed for on-line transaction processing (OLTP). OLTP includes posting data from "transactions" to a database table. As part of this process, OLTP systems employ a logging system to log changes that occur to the system. In some commercial products this is done by copying log records to a transaction log. Every transactional operation, including inserts, updates, and deletes, causes a log record to be written to the transaction log or simply "log." Each particular log record characterizes the change that has occurred to the database during processing of a transaction. This information can be used, for instance, in error recovery to restore the database to a preexisting, consistent state.

The logging system permits reading from and writing to the log. Write access is typically performed by "access methods" within a relational database system. In particular, these access methods generate log records that describe actions that affect the database. Read access, on the other hand, is generally provided by a recovery system within the database. In general, therefore, a database system includes systems for writing log records into the log and, if needed, reading back those records.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
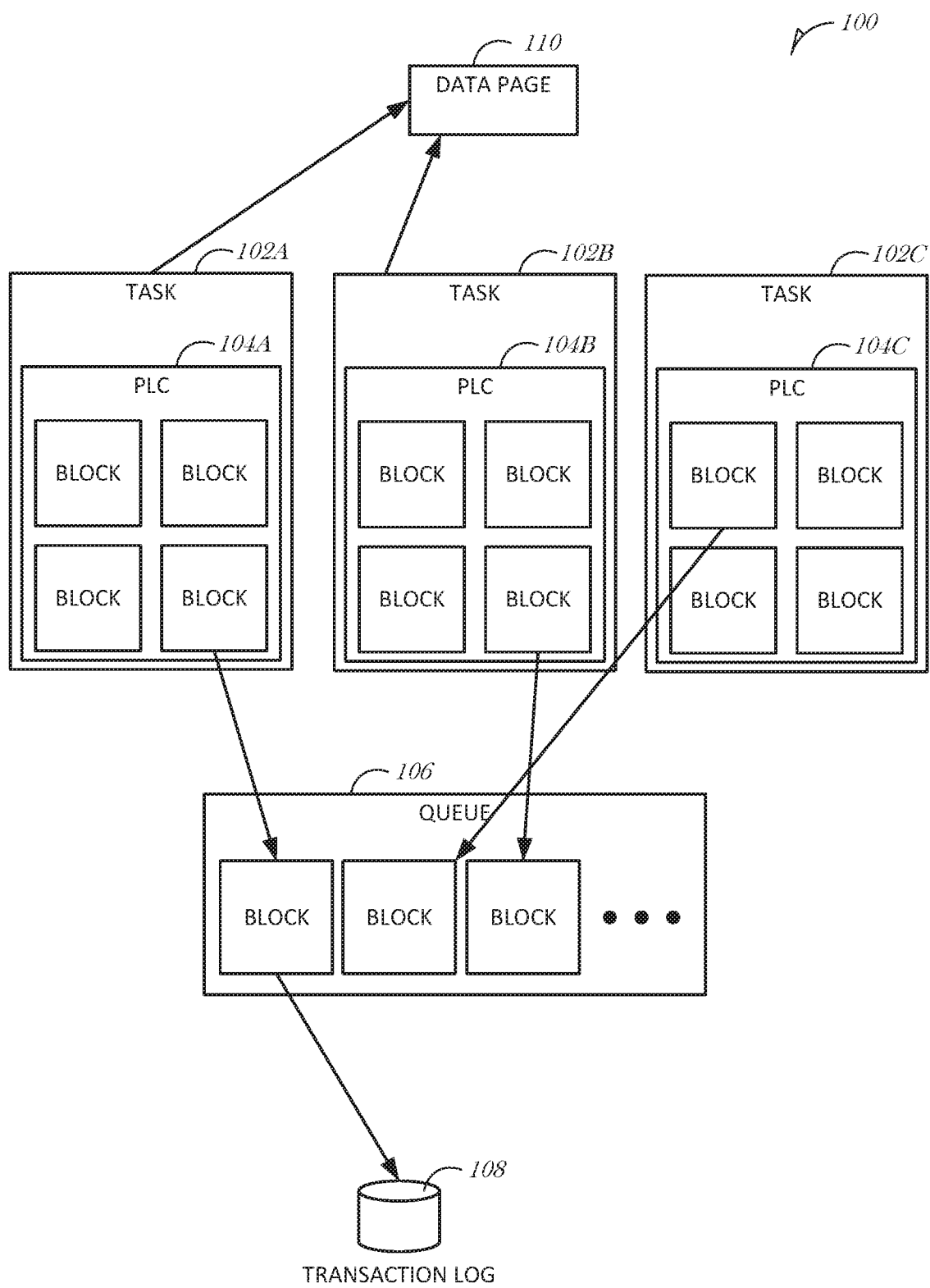
FIG. 1 is a block diagram illustrating control and data flow during logging operations in a DBMS environment, according to an example embodiment.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail.

The logging system of a database system presents a bottleneck to system scalability. This is because every insert, update, and delete operation makes a log entry to protect the database from corruption if a system failure or transaction rollback occurs. Most relational databases process a log entry for each update, insert, or delete statement, and each log entry is processed one at a time. When a log entry is written, the logging system navigates through a synchronization point referred to as the "log semaphore" which controls concurrent access to the end of the log by multiple transactions in a database. Because every transaction involves the logging system, its efficiency is paramount to transaction throughput. As scale increases in a database system and transaction volume increases, the contention for logging resources dramatically increases, resulting in reduced system throughput.

One way for reducing contention for logging resources in a transaction processing system is to provide a private log cache (PLC). A PLC (also referred to as a user log cache) provides an area of memory Where log records relating to a user's task are built and stored before being posted to the log. Each PLC can hold multiple log records for a transaction. The PLC is written to the log when a transaction commits or When memory fills with log records, thereby reducing steady state contention on the logging system.

Because the logging system is a shared resource in a multi-user database system, much contention exists for logging resources, as multiple users need access for performing transactions. At the same time, a database system must control access to the log to prevent one user from overwriting the results of another user.

Although use of a PLC reduces steady state contention on logging resources, several problems remain in logging systems of current database management systems that impact performance (e.g., throughput) of such systems. For example, on tables with a datarows lock scheme, log records in a PLC can need to be transferred to the transaction log before the PLC has been filled or before the transaction commits. Such premature transfers can decrease the efficacy or amount of batching and consequently, result in an increased contention on the log lock. The present disclosure describes a mechanism of using a queue to temporarily hold one or more blocks from PLCs. Using a queue reduces contention on the transaction log lock and increases database performance. When a user task has to commit a transaction, some or all of the blocks in the queue may be flushed to the transaction log in order to commit.

FIG. 1 is a block diagram illustrating control and data flow during logging operations in a DBMS environment 100, according to an example embodiment. As shown, the DBMS environment 100 includes three user tasks 102A, 102B, 102C (collectively 102), each with a respective private log cache (PLC) 104A, 104B, 104C (collectively 104). The DBMS environment 100 also includes a queue 106, and a transaction log 108. The logging system of a DBMS environment 100 can include at least two versions of the transaction log 108: an in-memory version and a disk (or persistent) version. The in-memory version includes transactions that have not been flushed to disk.

The PLCs 104 illustrated in FIG. 1 are each partitioned into a number of blocks to hold a plurality of log records in each block. The size of a block can be configured to be the same size as a server page. While FIG. 1 illustrates that each PLC 104 includes multiple blocks, it is understood that there can be a single block in a PLC 104. The number of blocks in a PLC 104 is calculated by dividing the size of the PLC 104 by the server page size. In some embodiments, a minimum of four blocks per PLC 104 is used unless the size of the PLC 104 is not big enough to hold them, in which case the server configures the PLC 104 with a single block. The queue 106 can exist as a queue in system memory, holding references (e.g., pointers) to one or more blocks from PLCs 104 containing log records.

During operation, the tasks 102 use the PLCs 104 to buffer the log records in system memory instead of directly logging records into the transaction log 108. Log records are added to a block in the PLC 104. When one transaction T1 wants to change a page that is already changed by another transaction T2, the log records for T1 must be flushed to the transaction log 108 before T2 is given access to the page. Instead of accessing the transaction log 108, blocks in the PLC are added to the queue 106. In addition, when a task needs to either flush a PLC 104 or commit a transaction, the task 102 queues log records from one or more blocks in the PLC 104 into the queue 106. Using this approach, each task 102 accesses the transaction log 108 less frequently.

The queue 106 includes pointers to blocks storing log records 110 that are linked together in memory. The queue 106 is accessed, at appropriate times, to identify which blocks to write to disk for creating the disk version of the transaction log 108. In typical operation, when a transaction "commits," the PLC block with log records for the transaction is first added to the queue 106 and then the log records in the PLC blocks in the queue 106 are flushed to transaction log 108 in memory. Typically, the transaction log 108 in memory is also written to disk.

In the example illustrated in FIG. 1, a task 102A performs a data manipulation statement (e.g., an INSERT SQL (Structured Query Language) statement) to update a row in a data page 110 in a database. The task 102A writes to the PLC 104A associated with the task 102A, then updates the data page 110, which pins the data page 110 to the PLC 104A. Later, task 102B performs a data manipulation statement (e.g., an UPDATE SQL statement) to update a different row from the same data page 110. In order to be able to modify the data page 110, the task 102B has to obtain a lock on the data page 110, which is held by task 102A. To obtain the lock, the task 102B obtains a spinlock on the queue 106 and moves the blocks with the log records from the INSERT statement of task 102A from PLC 104A to the queue 106, thus removing the dependency between the PLC 104A and the data page 110. Task 102B is then able to access and update the data page 110.

As used herein, a lock may be implemented in several ways, such as by use of a semaphore, a spinlock, a mutex, or a page state. In the case of a data page, the "lock" is on the page and the word "lock" is used loosely here as (in practice), it is not a lock. It is equivalent to a lock though. For example, if transaction t1 changes some row r1 in page p1, then page p1 is pinned to t1. Pinning is a page state, not actually a lock, though it acts as a lock. If transaction t2 wants to change another row r2 in page p1, then before it is given page p1 to change, the page must be "unpinned" from transaction t1. In conventional systems, unpinning involves moving the yet-to-be-flushed log records from t1 to the in-memory transaction log, forcing the acquisition of the log semaphore to do so. In the implementation discussed herein, unpinning involves queuing the active block in the PLC 104 that contains the log records, to the queue 106. There is no need to move the contents of the block to the in-memory transaction log 108. The acquisition of the log semaphore is therefore avoided. The same strategy is followed whenever log records would have been moved from the PLC 104 to the in-memory transaction log 108. The PLC block containing the log records (or a reference to the PLC block) can be moved to the queue rather than moving the log records directly from the PLC 104 to the in-memory transaction log 108.

Figure 2A:
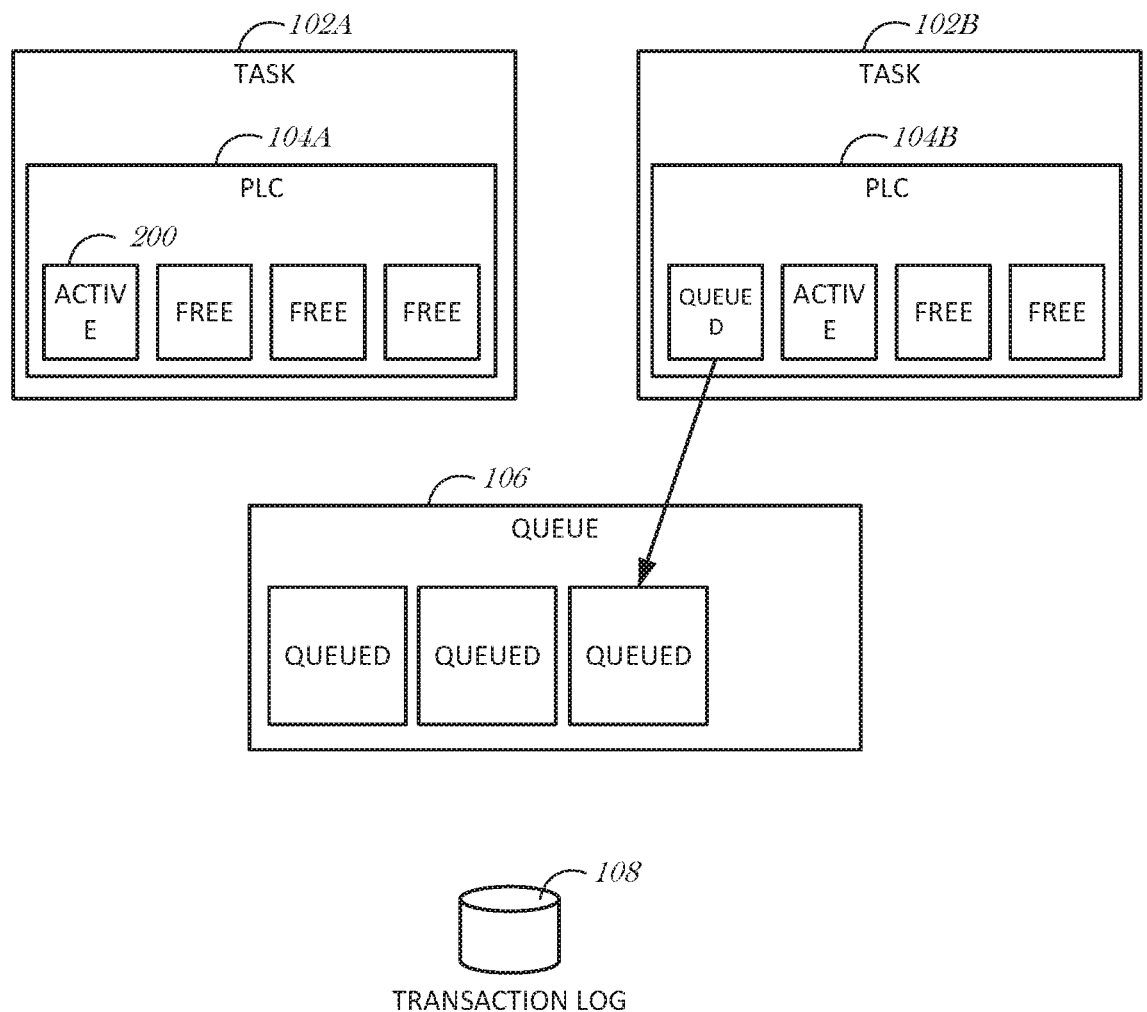
FIGS. 2A-2C are block diagrams illustrating the interaction between two user tasks, according to an example embodiment.
Figure 2B:
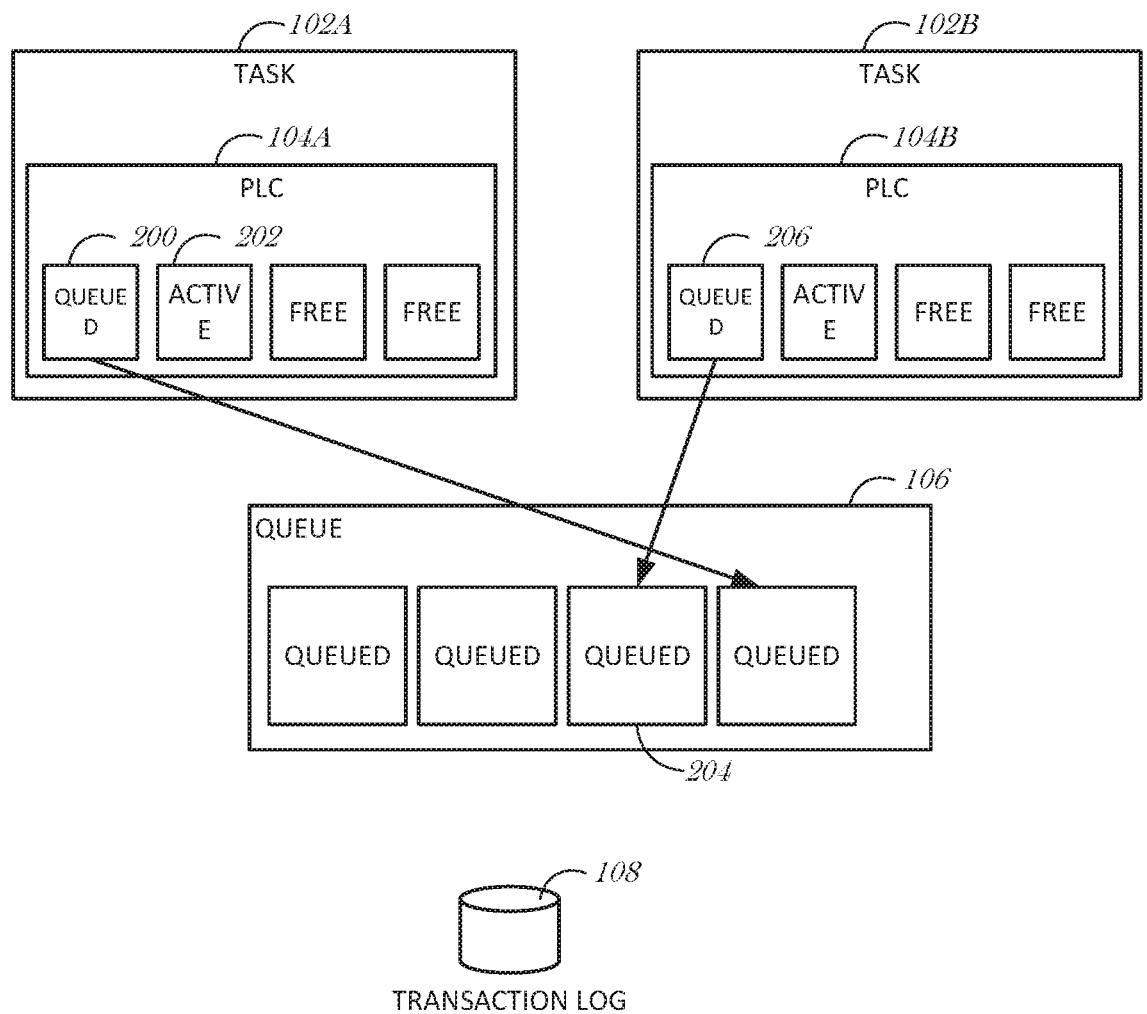
Figure 2C:
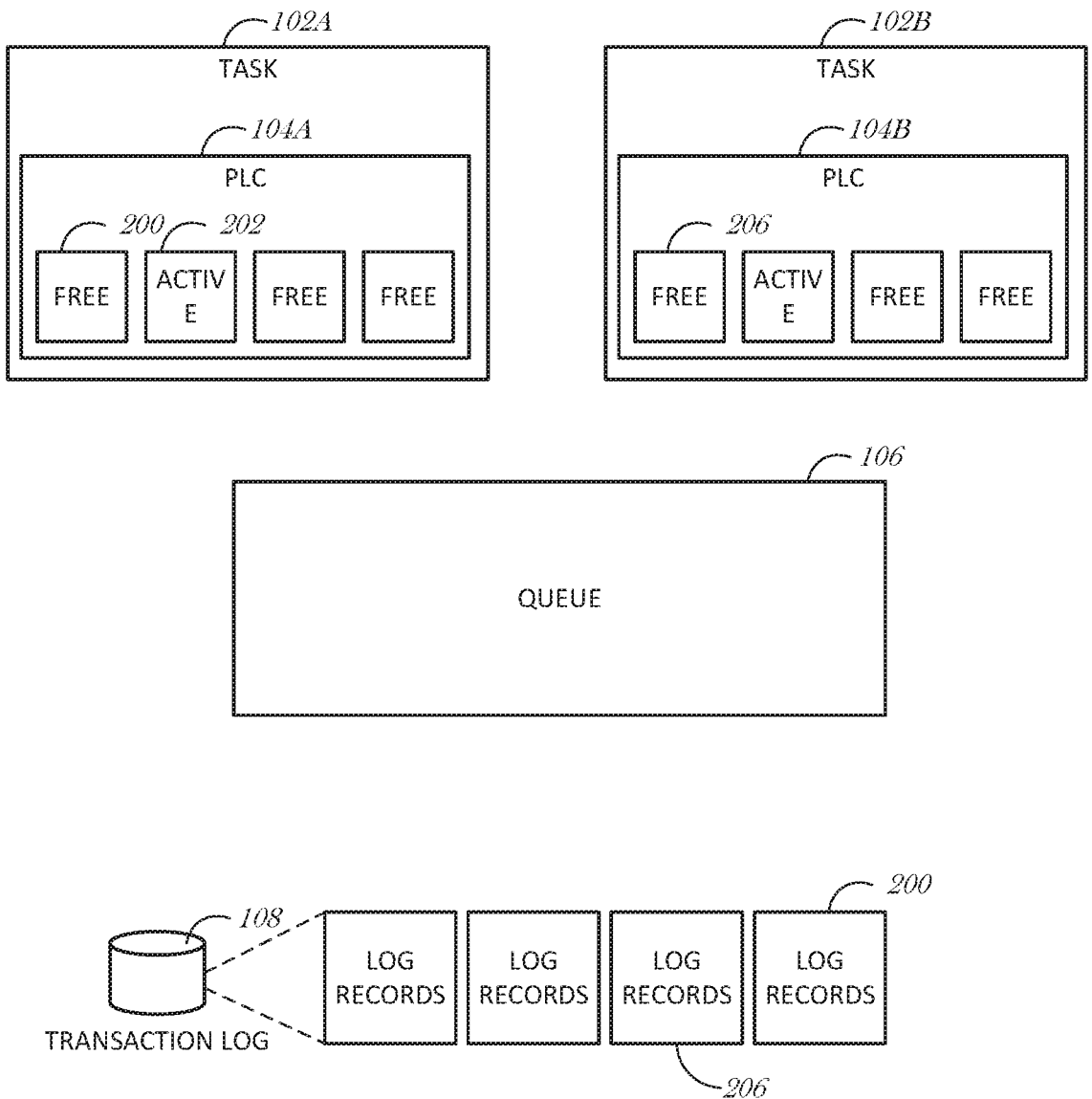

FIGS. 2A-2C are block diagrams illustrating the interaction between two user tasks, according to an example embodiment. User task 102A and task 102B are shown in FIG. 2A, however it is understood that more user tasks can be active and using the queue 106 or transaction log 108. One block from task 102B's PLC 104B is queued in the queue 106. Additional blocks are shown as being queued before task 102B's block. The queuing mechanism is used to maintain time order sequencing. It is understood that other data structures can be used other than a queue, such as a table with time stamps or an unordered linked list.

In FIG. 2A, task 102A is accessing a data page in a database. After writing the log record of the change in the active block 200 and making the change in the data page, the data page is pinned to the active block 200. When the PLC 104A is to be unpinned, a reference to the active block 200 is queued in the queue 106. In an embodiment, the contents of the block 200 are copied to the queue 106. In another embodiment, a pointer to the active block 200 is stored in the queue 106. To queue the active block 200 to the queue 106, a spinlock is obtained for the queue 106 by the task 102A, the active block 200 is queued (by reference or by value), the active block 200 is marked as being queued, and the next free block 202 is marked as the new active block for task 102A. The state of the PLC 104A is shows in FIG. 2B.

Continuing in the example, task 102A is ready to commit the changes to the database. This is performed by copying the log records in the blocks identified in the queue 106 to the transaction log 108. However, in order to maintain database consistency, task 102A has to first move earlier blocks enqueued before task 102A's queued block 200. Task 102A first obtains a lock on the transaction log 108. Then task 102A obtains a lock on the queue 106. Task 102A obtains the location of the first block in the queue 106, accesses the respective PLC, locks the block in the respective PLC that was queued, and copies the log records in the block from the respective PLC to the transaction log 108. For example, the queue 106 may hold pointers to memory locations for the beginning of each enqueued block. Task 102A is then able to dequeue a pointer, read the block memory location, and access the respective PLC using the memory location in order to copy the block from the PLC to the transaction log 108. This continues for each block in the queue 106. When task 102A encounters the block queued by task 102B (item 204), task 102A obtains a lock on the block 206 in task 102B's PLC 104B, At that point, task 102A can copy the block 206. Task 102A copies the block 206 from the PLC 104B of task 102B into the transaction log 108. After copying the queued blocks in the queue 106, task 102A can copy its own block (e.g., block 200 that was just enqueued) to the transaction log 108 to commit the transaction. FIG. 2C illustrates the state of the tasks 102A, 102B, the queue 106, and the transaction log 108 after task 102A commits the transaction.

Figure 3:
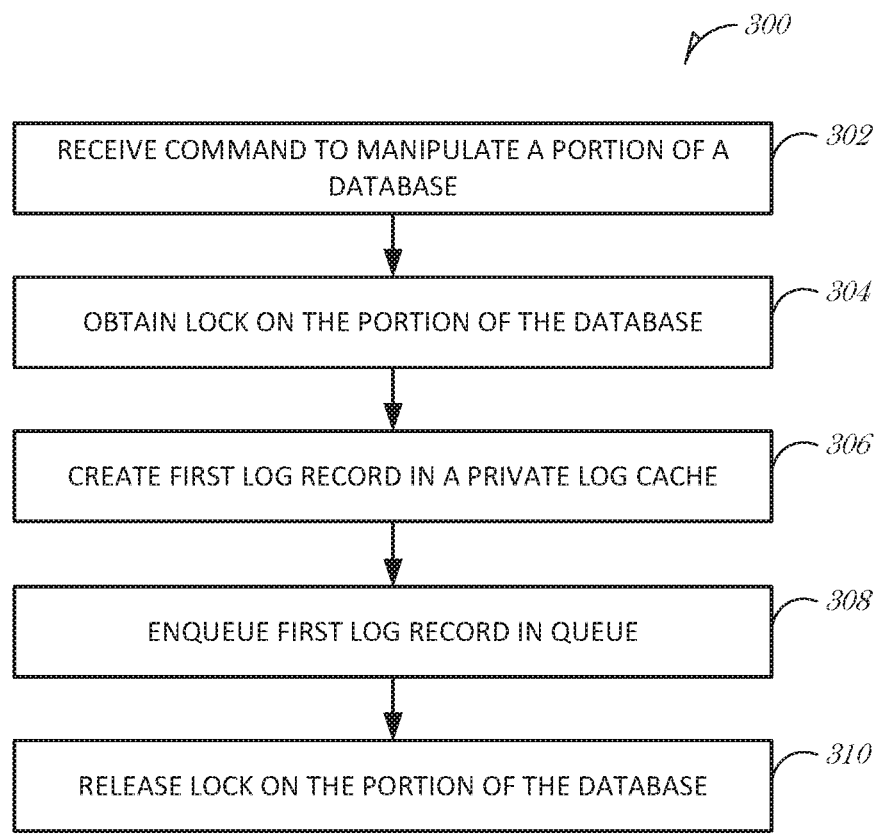
FIG. 3 is a flowchart illustrating a method, according to an example embodiment, for managing database logging.

FIG. 3 is a flowchart illustrating a method 300 for managing database logging, according to an example embodiment. At block 302, a command to manipulate a portion of a database managed by a database management system is received by a user task executing in the database management system on a database server. A command to manipulate a portion of a database may include a data manipulation statement. A data manipulation statement is one that can modify, add, or delete records in, to or, from a database table. Examples of data manipulation statements include, but are not limited to SQL statements such as INSERT, DELETE, and UPDATE. Other database manipulation commands may be commands that create, revise, or drop tables, indexes, views, users, groups, or the like.

At block 304, a lock on the portion of the database is obtained. A lock is a mechanism to preserve consistency within a database. Operations that modify data must be allowed to complete without interruption. Blocking other read or write operations until the modification is complete is referred to as locking.

At block 306, a first log record is created in a first private log cache associated with the user task, the first log record recording a data manipulation to the portion of the database. In an embodiment, the first log record is stored in a block in the first private log cache. In an embodiment, the first private log cache includes a plurality of blocks. In an embodiment, the first private log cache includes four blocks.

At block 308, the first log record is enqueued in a queue, the queue shared among a plurality of tasks executing in the database management system and the queue configured to store references to log records from one or more transactions of the plurality of tasks before such log records are written to a transaction log. To enqueue the first log record, the method 300 may obtain an address for the first log record (or a block containing the first log record) in the first private log cache. Then, the address is stored in the queue. A thread may manage the queue, so in an example, the method 300 may call the thread with a parameter including the address of the first log record or the block for the thread to enqueue the address to the queue. In an embodiment, enqueuing the first log record in the queue is in response to at least one of the first private log cache becoming full or to commit a transaction being handled by the user task. Another possible cause for enqueue is that the same data page that was changed by this task is to be changed by another task.

At block 310, the lock on the portion of the database is released after copying the first log record to the queue.

In a further embodiment, the method 300 includes receiving by the user task a command to commit the data manipulation to the database; traversing the queue to write log records to the transaction log that are earlier in time than the first log record; and writing the first log record to the transaction log to commit the data manipulation to the database.

In an embodiment, traversing the queue includes identifying a second private log cache associated with a second log record, the second log record having occurred earlier in time than the first log record; accessing the second private log cache; and writing the second log record from the second private log cache to the transaction log.

In an embodiment, the second log record is stored in a block in the second private log cache, and the method 300 includes after writing the second log record to the transaction log, marking the block in the second private log cache is being available for use.

Example Mobile Device

Figure 4:
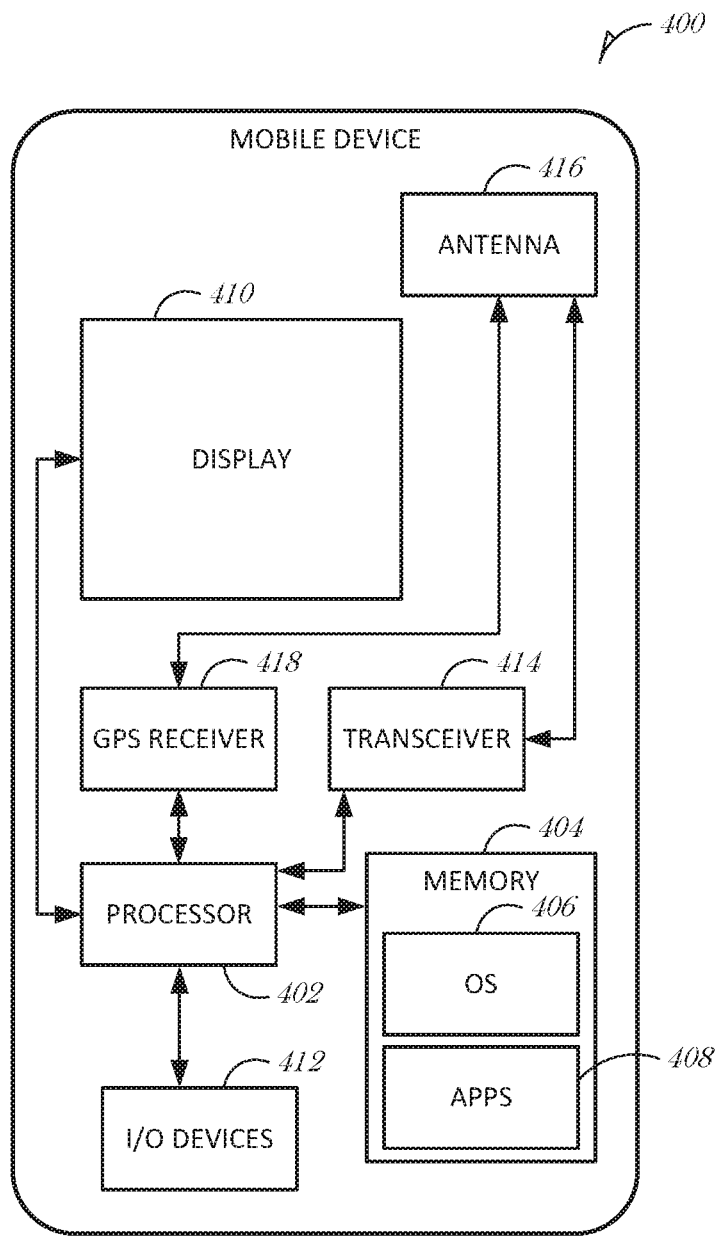
FIG. 4 is a block diagram illustrating a mobile device, in accordance with an example embodiment.

FIG. 4 is a block diagram illustrating a mobile device 400, according to an example embodiment. The mobile device 400 can include a processor 402. The processor 402 can be any of a variety of different types of commercially available processors suitable for mobile devices (for example, an XScale architecture microprocessor, a Microprocessor without interlocked Pipeline Stages (MIPS) architecture processor, or another type of processor). A memory 404, such as a Random Access Memory (RAM), a Flash memory, or other type of memory, is typically accessible to the processor. The memory 404 can be adapted to store an operating system (OS) 406, as well as application programs 408, such as a mobile location enabled application that can provide LBSs to a user or a database management system that can provide access to one or more databases stored at the mobile device. The processor 402 can be coupled, either directly or via appropriate intermediary hardware, to a display 410 and to one or more input/output (I/O) devices 412, such as a keypad, a touch panel sensor, a microphone, and the like. Similarly, in some embodiments, the processor 402 can be coupled to a transceiver 414 that interfaces with an antenna 416. The transceiver 414 can be configured to both transmit and receive cellular network signals, wireless data signals, or other types of signals via the antenna 416, depending on the nature of the mobile device 400. Further, in some configurations, a GPS receiver 418 can also make use of the antenna 416 to receive GPS signals.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Example Machine Architecture and Machine-Readable Medium

Figure 5:
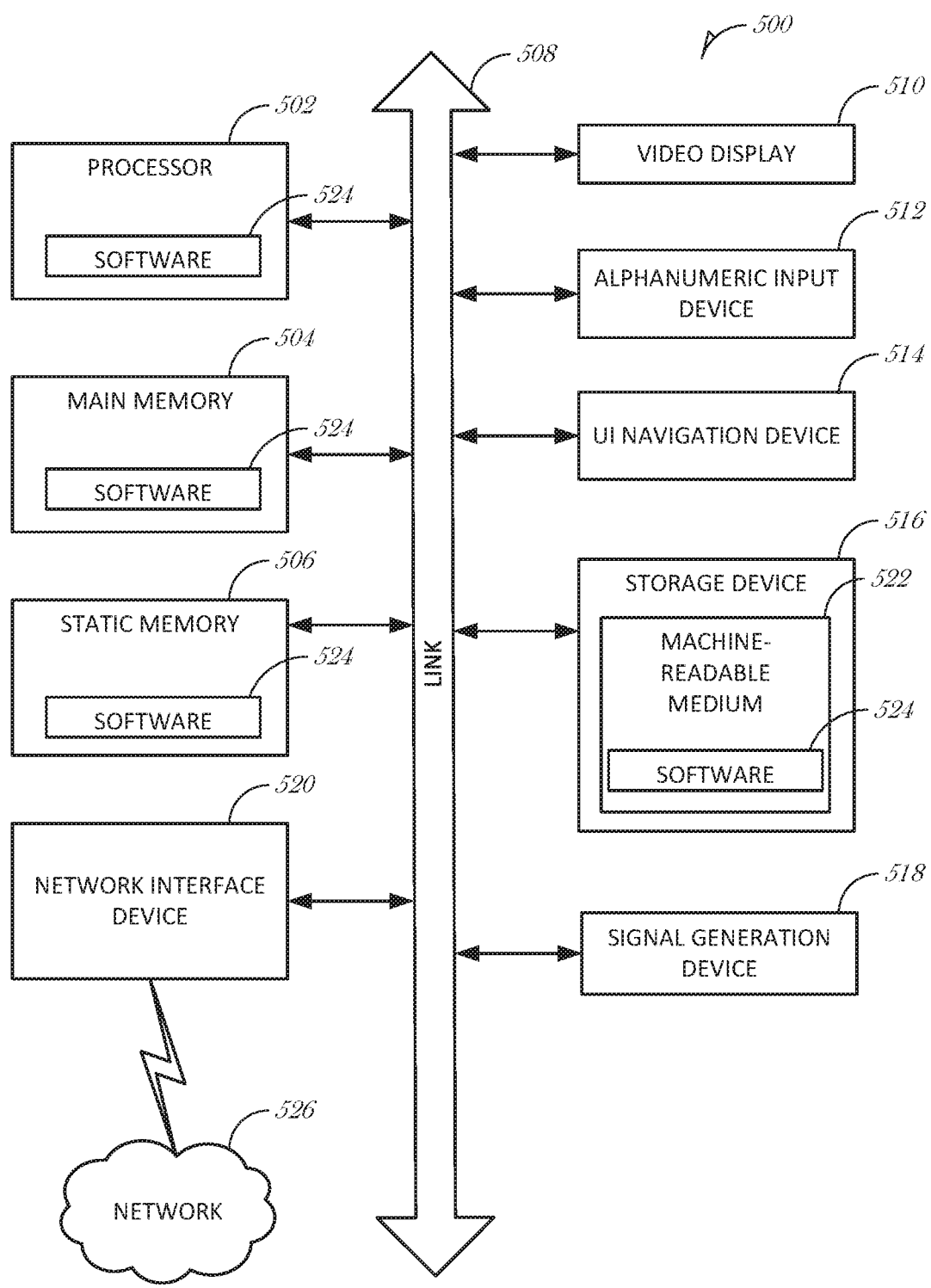
FIG. 5 is a block diagram of machine in the example form of a computer system within which instructions, for causing the machine to perform any one or more of the methodologies discussed herein, can be executed.

FIG. 5 is a block diagram of machine in the example form of a computer system 500 within which instructions, for causing the machine to perform any one or more of the methodologies discussed herein, can be executed. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU), or both), a main memory 504 and a static memory 506, which communicate with each other via a link 508 (e.g., bus). The computer system 500 can further include a video display unit 510 (e.g., a liquid crystal display (LCD) or a cathode ray tube (CRT)). The computer system 500 also includes an alpha-numeric input device 512 (e.g., a keyboard or a touch-sensitive display screen), a user interface (UI) navigation device 514 (e.g., a mouse), a disk drive unit 516, a signal generation device 518 (e.g., a speaker), and a network interface device 520.

Machine-Readable Medium

The disk drive unit 516 includes a machine-readable medium 522 on which is stored one or more sets of instructions and data structures (e.g., software) 524 embodying or utilized by any one or more of the methodologies or functions described herein. The instructions 524 can also reside, completely or at least partially, within the main memory 504 and/or within the processor 502 during execution thereof by the computer system 500, with the main memory 504 and the processor 502 also constituting machine-readable media.

While the machine-readable medium 522 is shown in an example embodiment to be a single medium, the term "machine-readable medium" can include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 524 can further be transmitted or received over a communications network 526 using a transmission medium. The instructions 524 can be transmitted using the network interface device 520 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   creating, by one or more processors, a log record in a private log cache that corresponds to a user task, the created log record indicating a data operation to be performed on a portion of a database;
   enqueuing, by the one or more processors, the log record into a queue before the log record is written to an in-memory version of a transaction log distinct from the queue, the enqueuing the log record into the queue comprising adding, to the queue, a pointer to a memory location of the log record in the private log cache;

writing, by the one or more processors, the log record into the in-memory version of the transaction log after the enqueuing of the log record into the queue distinct from the transaction log; and writing, by the one or more processors, the log record into a disk version of the transaction log.

2. The method of claim 1, wherein:
the enqueuing of the log record into the queue before the log record is written to the in-memory version of the transaction log is in response to the private log cache becoming full.

3. The method of claim 1, wherein:
the enqueuing of the log record into the queue before the log record is written to the in-memory version of the transaction log is in response to a command to commit a transaction that corresponds to the user task.

4. The method of claim 1, further comprising:
obtaining a lock on the portion of the database; and wherein:
the enqueuing of the log record into the queue before the log record is written to the in-memory version of the transaction log is performed after the obtaining of the lock on the portion of the database.

5. The method of claim 1, further comprising:
obtaining a lock on the portion of the database; and
releasing the lock on the portion of the database after the enqueuing of the log record into the queue.

6. The method of claim 1, wherein:
the queue is shared among a plurality of user tasks and configured to store references to enqueued log records that correspond to the plurality of user tasks before the enqueued log records are written to in-memory versions of transaction logs distinct from the queue.

7. The method of claim 1, further comprising:
receiving a command to commit the data operation to be performed on the portion of the database; and
writing log records enqueued earlier than the log record from the queue to the disk version of the transaction log.

8. The method of claim 7, wherein:
the log record is a first log record;
the private log cache is a first private log cache; and
the method further comprises:
accessing a second private log cache that includes a second log record older than the first log record in the first private log cache; and
writing the second log record into the disk version of the transaction log.

9. A system comprising:
one or more processors; and
a memory storing instructions that, when executed by at least one processor among the one or more processors, cause the system to perform operations comprising:
creating a log record in a private log cache that corresponds to a user task, the created log record indicating a data operation to be performed on a portion of a database;
enqueuing the log record into a queue before the log record is written to an in-memory version of a transaction log distinct from the queue, the enqueuing the log record into the queue comprising adding, to the queue, a pointer to a memory location of the log record in the private log cache;
writing the log record into the in-memory version of the transaction log after the enqueuing of the log record into the queue distinct from the transaction log; and
writing the log record into a disk version of the transaction log.

10. The system of claim 9, wherein:
the enqueuing of the log record into the queue before the log record is written to the in-memory version of the transaction log is in response to the private log cache becoming full.

11. The system of claim 9, wherein:
the enqueuing of the log record into the queue before the log record is written to the in-memory version of the transaction log is in response to a command to commit a transaction that corresponds to the user task.

12. The system of claim 9, wherein the operations further comprise:
obtaining a lock on the portion of the database; and wherein:
the enqueuing of the log record into the queue before the log record is written to the in-memory version of the transaction log is performed after the obtaining of the lock on the portion of the database.

13. The system of claim 9, wherein the operations further comprise:
obtaining a lock on the portion of the database; and
releasing the lock on the portion of the database after the enqueuing of the log record into the queue.

14. The system of claim 9, wherein:
the queue is shared among a plurality of user tasks and configured to store references to enqueued log records that correspond to the plurality of user tasks before the enqueued log records are written to in-memory versions of transaction logs distinct from the queue.

15. The system of claim 9, wherein the operations further comprise:
receiving a command to commit the data operation to be performed on the portion of the database; and
writing log records enqueued earlier than the log record from the queue to the disk version of the transaction log.

16. A non-transitory machine-readable storage medium comprising instructions that, when executed by one or more processors of a machine, cause the machine to perform operations comprising:
creating a log record in a private log cache that corresponds to a user task, the created log record indicating a data operation to be performed on a portion of a database;
enqueuing the log record into a queue before the log record is written to an in-memory version of a transaction log distinct from the queue, the enqueuing the log record into the queue comprising adding, to the queue, a pointer to a memory location of the log record in the private log cache;
writing the log record into the in-memory version of the transaction log after the enqueuing of the log record into the queue distinct from the transaction log; and
writing the log record into a disk version of the transaction log.

17. The non-transitory machine-readable storage medium of claim 16, wherein:
the enqueuing of the log record into the queue before the log record is written to the in-memory version of the transaction log is in response to the private log cache becoming full.

18. The non-transitory machine-readable storage medium of claim 16, wherein:
   the enqueuing of the log record into the queue before the log record is written to the in-memory version of the transaction log is in response to a command to commit a transaction that corresponds to the user task.

19. The non-transitory machine-readable storage medium of claim 16, wherein the operations further comprise:
   obtaining a lock on the portion of the database; and wherein:
   the enqueuing of the log record into the queue before the log record is written to the in-memory version of the transaction log is performed after the obtaining of the lock on the portion of the database.

20. The non-transitory machine-readable storage medium of claim 16, wherein the operations further comprise:
   obtaining a lock on the portion of the database; and
   releasing the lock on the portion of the database after the enqueuing of the log record into the queue.

\* \* \* \* \*